US010018306B2

(12) United States Patent
Fanger et al.

(10) Patent No.: US 10,018,306 B2
(45) Date of Patent: Jul. 10, 2018

(54) INCREASED STORAGE CAPACITY OF GAS IN PRESSURE VESSELS

(71) Applicant: Cenergy Solutions Inc., Fremont, CA (US)

(72) Inventors: Gary Warren Fanger, Piedmont, CA (US); Aaron M. Feaver, Seattle, WA (US); Gary Cox, Oakland, CA (US); Buddy T. Koga, Fremont, CA (US); Walter L. DeCelle, Alameda, CA (US); Michael A. Maxey, Jr., Sunol, CA (US)

(73) Assignee: Cenergy Solutions Inc., Fremont, CA (US)

( * ) Notice: Subject to any disclaimer, the term of this patent is extended or adjusted under 35 U.S.C. 154(b) by 0 days.

(21) Appl. No.: 15/067,072

(22) Filed: Mar. 10, 2016

(65) Prior Publication Data

US 2016/0341361 A1 Nov. 24, 2016

Related U.S. Application Data

(60) Provisional application No. 62/132,508, filed on Mar. 13, 2015.

(51) Int. Cl.
*F17C 11/00* (2006.01)
*F17C 5/06* (2006.01)
(Continued)

(52) U.S. Cl.
CPC ...... *F17C 11/007* (2013.01); *B60K 15/03006* (2013.01); *F17C 5/06* (2013.01);
(Continued)

(58) Field of Classification Search
CPC ........ F17C 11/007; F17C 11/005; F17C 5/06; F17C 13/026; F17C 2260/012;
(Continued)

(56) References Cited

U.S. PATENT DOCUMENTS 3,083,528 A 4/1963 Brown
3,490,205 A * 1/1970 Hauser ..................... B64G 5/00
55/343
(Continued)

FOREIGN PATENT DOCUMENTS

WO WO 2016149049 A1 * 9/2016 ............ F17C 13/026

OTHER PUBLICATIONS

International Search Report and Written Opinion dated Jul. 15, 2016, issued in corresponding International Application No. PCT/US2016/021875, filed Mar. 10, 2016, 10 pages.
(Continued)

*Primary Examiner* — Nicolas A Arnett
(74) *Attorney, Agent, or Firm* — Christensen O'Connor Johnson Kindness PLLC

(57) ABSTRACT

A gas system includes a container, a fitting, a gas tube, adsorbent, and a filter. The container stores gas under pressure. The fitting covers an opening of the container and maintains a seal with the opening of the container. The gas tube is inserted through a bore in the fitting such that a length of a portion of the gas tube inside of the container is at least one half of a length of the container. The portion of the gas tube in the container includes holes. The adsorbent is in a particulate form and adsorbs gas in the container. The filter covers the holes in the portion of the gas tube in the container. The filter permits passage of gas into and out of the gas tube and prevents passage of the adsorbent into the gas tube.

18 Claims, 5 Drawing Sheets

(51) Int. Cl.
*F17C 13/02* (2006.01)
*B60K 15/03* (2006.01)

(52) U.S. Cl.
CPC .......... *F17C 11/005* (2013.01); *F17C 13/026* (2013.01); *B60K 2015/03013* (2013.01); *B60K 2015/03019* (2013.01); *B60K 2015/03026* (2013.01); *F17C 2201/0104* (2013.01); *F17C 2205/0338* (2013.01); *F17C 2205/0341* (2013.01); *F17C 2205/0352* (2013.01); *F17C 2221/033* (2013.01); *F17C 2250/0439* (2013.01); *F17C 2250/0626* (2013.01); *F17C 2260/012* (2013.01); *F17C 2270/0168* (2013.01)

(58) Field of Classification Search
CPC ...... F17C 2205/0352; F17C 2205/0341; F17C 2205/0338; F17C 2221/033; F17C 2201/0104; F17C 2250/0626; F17C 2250/0439; F17C 2270/0168; B60K 15/03006; B60K 2015/03013; B60K 2015/03026; B60K 2015/03019
See application file for complete search history.

(56) References Cited

U.S. PATENT DOCUMENTS

| | | | |
|---|---|---|---|
| 4,941,962 A | | 7/1990 | Inoue |
| 5,227,598 A | | 7/1993 | Woodmansee et al. |
| 5,616,838 A | | 4/1997 | Preston et al. |
| 5,912,424 A | | 6/1999 | Judkins et al. |
| 6,660,063 B2* | 12/2003 | Tom ................... B01D 53/0407 206/0.7 |
| 6,910,602 B2* | 6/2005 | Hasaka ................... F17C 13/04 222/189.1 |
| 8,100,151 B2* | 1/2012 | Handa ....................... F17C 1/00 141/82 |
| 8,302,802 B2* | 11/2012 | Handa ................... F17C 11/005 220/562 |
| 9,188,284 B2* | 11/2015 | Luo ........................... F17C 1/00 |
| 9,328,868 B2* | 5/2016 | Dailly ................... F17C 11/007 |
| 2003/0033930 A1* | 2/2003 | Tom ................... B01D 53/0407 95/45 |
| 2003/0150510 A1 | 8/2003 | Cohen et al. |
| 2003/0192430 A1 | 10/2003 | Pearlstein et al. |
| 2005/0051294 A1* | 3/2005 | Fujita ..................... C01B 3/0005 165/10 |
| 2008/0290645 A1* | 11/2008 | Handa ....................... F17C 1/00 280/834 |
| 2008/0296306 A1* | 12/2008 | Handa ................... F17C 11/005 220/581 |
| 2008/0302110 A1* | 12/2008 | Handa ..................... F17C 5/007 62/50.1 |
| 2008/0302246 A1 | 12/2008 | Carruthers et al. |
| 2011/0127174 A1* | 6/2011 | Heinrich ................ B82Y 30/00 206/0.7 |
| 2011/0136923 A1 | 6/2011 | Cha |
| 2012/0043352 A1* | 2/2012 | Rasmussen .......... B67D 1/0412 222/386.5 |
| 2013/0220479 A1 | 8/2013 | Luo et al. |
| 2014/0026868 A1 | 1/2014 | Dolan et al. |
| 2014/0290751 A1* | 10/2014 | Dailly ................... F17C 13/084 137/1 |
| 2014/0290789 A1* | 10/2014 | Dailly ................... F17C 11/007 141/4 |
| 2015/0073164 A1 | 3/2015 | Nomura et al. |
| 2015/0090344 A1* | 4/2015 | Dolan ..................... F17D 5/005 137/15.01 |
| 2015/0090611 A1* | 4/2015 | Dolan ..................... F17D 5/005 206/0.7 |
| 2015/0247605 A1* | 9/2015 | Despres ................. F17C 13/04 222/1 |
| 2016/0186932 A1* | 6/2016 | Weickert ............... F17C 11/007 206/0.7 |
| 2016/0356425 A1* | 12/2016 | Fanger ................. F17C 11/007 |
| 2017/0122496 A1* | 5/2017 | Scannell .............. F17C 13/04 |

OTHER PUBLICATIONS

International Search Report and Written Opinion dated Aug. 12, 2016, issued in corresponding International Application No. PCT/US2016/031066 filed May 5, 2016, 7 pages.

International Preliminary Report on Patentability dated Sep. 19, 2017, issued in corresponding International Application No. PCT/US2016/021875, filed Mar. 10, 2016, 7 pages.

* cited by examiner

INCREASED STORAGE CAPACITY OF GAS IN PRESSURE VESSELS

CROSS-REFERENCE TO RELATED APPLICATION

This application claims the benefit of U.S. Provisional Application No. 62/132,508, filed Mar. 13, 2015, the entire disclosure of which is incorporated herein by reference.

BACKGROUND

Tanks can be used to contain fluids under pressure. Under certain circumstances, it is desirable to have a tank with relatively thin walls and low weight. For example, in a vehicle fuel tank, relatively thin walls allow for more efficient use of available space, and relatively low weight allows for movement of the vehicle with greater energy efficiency. Recent work suggests that adsorbent materials, such as activated carbon and/or metal-organic frameworks, may be used to store gases, such as natural gas, by lowering pressures with adsorbent relative to current storage containers or increasing the storage capacity of gases in a tank. (See Zakaria et al., *Int'l Journ. Rec. Rsrch. Appl. Stud.* 9:225-230, 2011.)

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment a gas system includes a container configured to store gas under pressure, a fitting, a gas tube, adsorbent, and a filter. The fitting is configured to cover an opening of the container and maintain a seal with the opening of the container at least up to a particular pressure of the gas. The gas tube is configured to be inserted through a first bore in the fitting such that a length of a portion of the gas tube inside of the container is at least one half of a length of the container, and the portion of the gas tube in the container includes a plurality of holes. In other embodiments the gas tube may extend less than half way along the length of the container. In some embodiments the gas tube may comprise a plurality of spaced apart sections, for example the gas tube may branch into several tube segments that extend generally parallel to the axis of the container. The adsorbent is in a particulate form located in the container and outside of the gas tube, and the adsorbent is configured to adsorb a portion of the gas in the container, wherein a characteristic dimension of the particles allows the particles to be filtered, as discussed below. The filter is coupled to the gas tube and configured to cover the plurality of holes in the portion of the gas tube in the container, and the filter is configured to permit passage of gas into and out of the gas tube and to prevent passage of the adsorbent into the gas tube.

In one example, the fitting is in a cylindrical form and has external threads configured to engage internal threads on the opening of the container to form the seal with the opening of the container. In another example, the filter is a mesh filter configured to filter particles down to about 5 microns. In another example, the mesh filter is secured to the gas tube with at least two clamps. In another example, the gas system further includes a tube inserted through a second bore in the fitting such that a portion of the tube is located inside of the container. In another example, the gas system further includes a temperature probe located at least partially in the portion of the tube in the container, where the temperature probe is configured to produce a signal indicative of a temperature inside of the container.

In another example, a pressure relief device is coupled to a second opening of the container. In another example, one portion of the container having a cross section perpendicular to an axis of the container has a larger diameter than a diameter of the opening of the container. In another example, the filter is secured to the gas tube by a weld. In another example, the filter is secured to the gas tube by a bonding agent. In another example, the gas system further includes a device configured to deliver an electric charge to the adsorbent to generate heat and increase the desorption or release rate of the gas from the adsorbent.

In another example, the gas system further includes at least one adsorbent dam configured to prevent the adsorbent inside the container from exiting the container via one or both of the opening of the container or another opening of the container. In another example, the at least one adsorbent dam is punctured in one or more locations to accommodate passage of one or more components through the at least one adsorbent dam. In another example, the adsorbent is configured to be inserted into the container via a tube passing through one of the opening in the container or another opening in the container by a vacuum coupled to the gas tube, and the vacuum is configured to create a vacuum in the gas tube such that the adsorbent is drawn from a source of the adsorbent into the container. In another example, the holes in the gas tube are distributed such that the gas is able to flow from the gas tube into the container and from the container in to the gas tube at a plurality of different locations with the container.

In another embodiment, a method is used to fill a container with gas, where the container includes adsorbent in particulate form and a gas tube that extends into the container and has a plurality of holes covered by a filter configured to prevent the adsorbent from entering the gas tube. The method includes inserting a flow of gas into the container from a gas source via the gas tube until the pressure inside of the container reaches a high fill pressure, pausing or slowing the flow of the gas being inserted into the container in response to the pressure and heat inside of the container until the pressure or heat inside of the container is optimized for adsorption to take place, resuming the flow of gas into the container from the gas source via the gas tube until the pressure or heat inside of the container reaches a specific fill pressure, repeating the pausing or slowing of the flow of the gas and the resuming of the flow of the gas until the pressure in the container does not fall to the low fill pressure, and disconnecting the gas source from the container in response to the pressure in the container not falling to the low fill pressure.

In another embodiment, a system for powering a vehicle includes a gas system, an engine, a gas line, and a pressure regulator. The gas system includes a container, adsorbent in particulate form inside of the container and configured to adsorb gas within the container, and a gas tube that extends into the container and has a plurality of holes covered by a filter configured to prevent the adsorbent from entering the gas tube. The engine is configured to power the vehicle using the gas in the container. The gas line is configured to direct a flow of gas from the gas tube to at least one injector configured to inject the gas into the engine. The pressure regulator is coupled to the gas line and configured to regulate a pressure of the gas in the gas flow such that the gas reaches the at least one injector at a regulated pressure, wherein the regulated pressure is in a range from about 5 psi to about 149 psi.

In one example, the system further includes an electronic control unit configured to control at least the pressure regulator. In another example, the system further includes a fuel selector switch configured to permit a user to selectively control a fuel to the engine, where the fuel is one or more of the gas from the system, a gasoline fuel, or a diesel fuel. In another example, the system further includes a vacuum pump configured to reduce pressure in the gas line to increase a release rate of the gas from the adsorbent. In another example, the container has a wall thickness selected based on a rated operating pressure, and wherein the rated operating pressure is less than or equal to about 3,600 psi. In another example, a shape of the container is one of a spherical shape, a cubic shape, or a rectangular prism shape. In another example, the container is shaped based on a specific space of the vehicle or a specific enclosed space.

In another embodiment, a gas compressor system is used for filling a container with gas. The gas compressor system includes a gas compressor, a container configured to hold gas in a pressurized form, and a pressure switch. The pressure switch is configured to start the compressor filling the container with gas, determine that a pressure in the container has reached a high fill pressure, stop the compressor from filling the container with gas in response to determining that the pressure in the container has reached the high fill pressure, determine that the pressure in the container has reached a low fill pressure, and restart the compressor filling the container with gas in response to determining that the pressure in the container has reached the low fill pressure.

In one example, the container is configured to be installed on a vehicle. In another example, the compressor is installed on the vehicle separately from the installation of the container. In another example, the compressor installed on the vehicle is configured to power an air conditioning system of the vehicle in addition to filling the container with gas. In another example, the gas compressor system further includes a vacuum pump configured to compress gas into the container during filling of the container and further configured to decrease pressure in the container during operation of the vehicle. In another example, the gas compressor system further includes a gas detection device configured to sense gas outside of the gas compressor system and to discontinue operation of the compressor in response to detecting gas outside of the gas compressor system.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The present disclosure is generally related to pressure vessels, such as gas storage containers (e.g., "cylinders" or "tanks"), that include gas adsorbents to increase storage capacity of the pressure vessels. One challenge with the use of gas adsorbents is that gas adsorption is inversely proportional with temperature—adsorbents adsorb gas more readily under cooler temperatures and release (desorb) gas more readily under warmer temperatures. Under certain conditions, the filling of a pressure vessel with gas through a single entry point on the perimeter of a pressure vessel (e.g., a valve) cools the gas entering the pressure vessel and, therefore the adsorbent at the entry of the vessel is cooled. The heating of the gas happens once the pressure is increased to a target pressure close (for example, approximately 2,000 psi) and the adsorbent starts the adsorption process and at that time the warmer adsorbent reduces the storage capacity of the pressure vessel. Confounding the usefulness by deteriorating the delivery efficiency is that the gas and adsorbent naturally cools when gas releases from the adsorbent, which in turn decreases the release rate of gas molecules from adsorbent in a container. Further confounding the adsorption and desorption or release rates is the single point of entry and exit gas from the container combined with low heat transference by adsorbents, such as activated carbon.

Some of the embodiments of systems and methods described herein are directed to (a) cooling adsorbed natural gas ("ANG") to accelerate adsorption during filling and (b) accelerating release of gas by heating the ANG when release is desired. Such embodiments may be useful in certain circumstances, such as storage of natural gas at wellheads, compressed natural gas (CNG) fueling stations, transportation of CNG, replacing liquid petroleum gas (LPG) tanks with ANG tanks and operation of vehicles with CNG. Other circumstances may also benefit from the embodiments disclosed herein by, among other things, better utilizing adsorbents with gas and gas containers. The effective use of adsorbents will enhance the ability to store, transport, and release gas in a more economical and efficient way.

Figure 1:
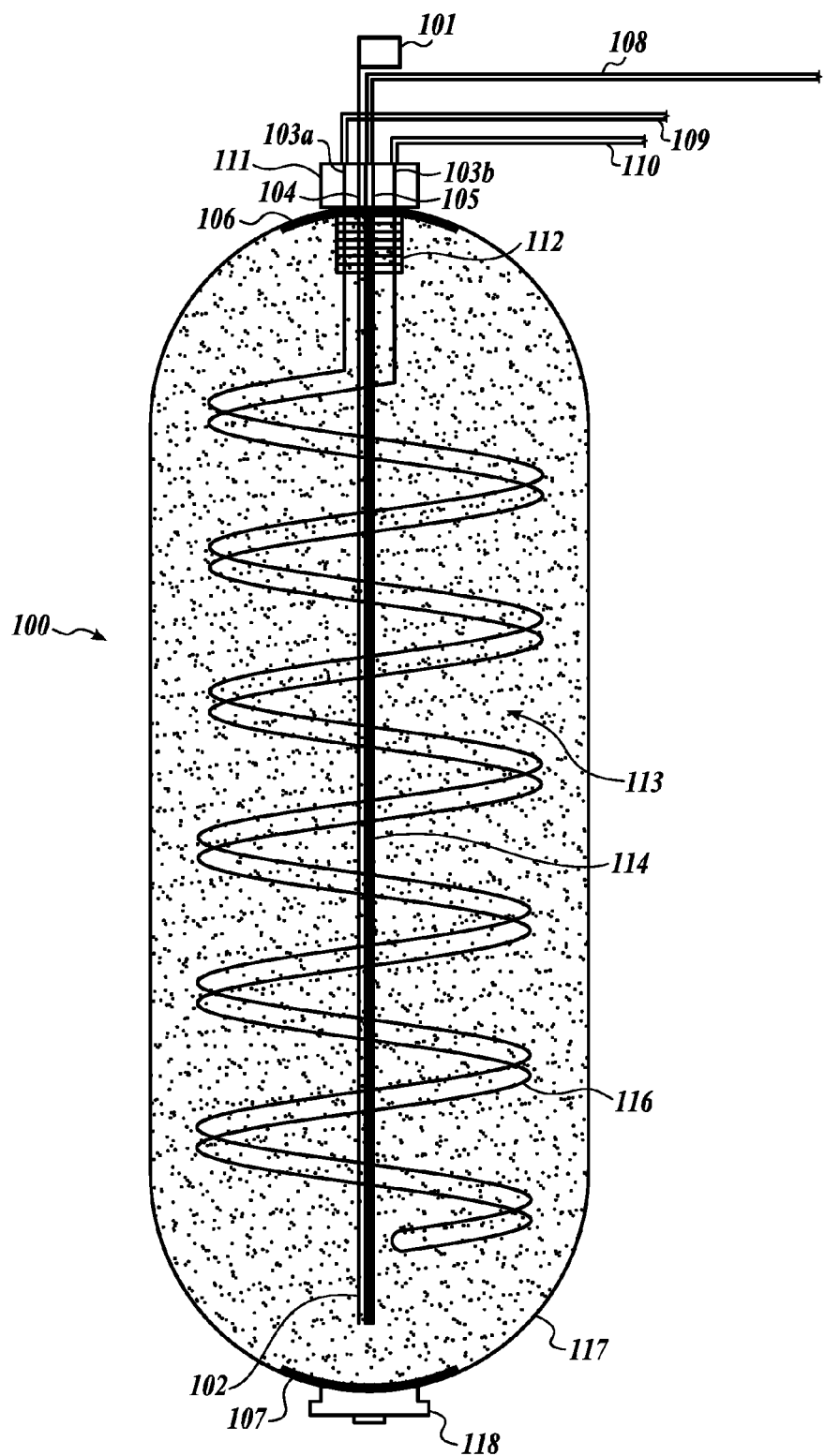
FIG. 1 depicts an embodiment of an adsorbed natural gas (ANG) system in accordance with the present invention.

Depicted in FIG. 1 is an embodiment of an ANG system 100. The ANG system includes a pressure vessel container 117, such as a tank or a cylinder. The container 117 is configured to store natural gas. In some embodiments, the container 117 has a service pressure rating, which is a pressure to which the container 117 is configured to be filled with natural gas. In one example, the container 117 has a service pressure rating of about 3,600 pounds per square inch (psi). As used herein, the term about means within 5% of the target value.

The container 117 holds an adsorbent 113. In some embodiments, the adsorbent 113 include one or more of an activated carbon, a metal-organic framework, or any other material configured to adsorb natural gas. Activated carbon is typically carbon processed to have small, low-volume pores that increase the surface area (i.e., high microporosity). In some examples, one gram of activated carbon has a surface area in excess of 500 m$^2$. In some embodiments, the adsorbent 113 is an activated carbon in powder form (e.g., with adsorbent particle sizes between about 0.01 microns and 4,000 microns or more). With the adsorbent 113 in the container 117, the container 117 is capable of storing more natural gas within the service pressure rating than the container 117 would be able to store without the adsorbent 113 in the container 117. In general, the smaller particle size provides more surface area to store gases.

In the embodiment shown in FIG. 1, the ANG system 100 includes a fitting 111 at one end of the container 117 and a pressure release device (PRD) 118 at the opposite end of the container 117. In one embodiment, the fitting 111 is cylindrical in shape. In some examples, the cylindrical shape of the fitting 111 has a diameter in a range from about 1 inch to about 3 inches. In other example, the fitting 111 has another size based on the opening of the container 117. In other embodiments, the fitting 111 has a different shape or combination of shapes, such as a rectangular solid, a coned shape, and the like. The fitting 111 is configured to permit certain components access to the interior of the container 117 while maintaining a seal with the container and any components that is sufficient to withstand gas pressures in the container 117 up to the service pressure rating. In the depicted embodiment, the fitting 111 has external threads 112 configured to engage internal threads of the container 117. In some embodiments, the fitting 111 is made from a metallic material (e.g., brass, aluminum, stainless steel), non-metallic materials (e.g., plastic, elastomer), or some combination thereof. As also shown in the depicted embodiment, the fitting 111 includes bores 103a, 103b, 104, and 105 configured to permit certain components access to the interior of the container 117. While the depicted embodiment of the fitting 111 includes four bores 103a, 103b, 104, and 105, other embodiments of fittings include any number of bores. In some embodiments the bores 103a, 103b, 104, and 105 have diameters in a range from about ⅛ inch to about ½ inch. In other embodiments, the bores 103a, 103b, 104, and 105 have diameters greater than ½ inch, depending on the application and the size of the container 117.

In the embodiment depicted in FIG. 1, the ANG system 100 includes a gas tube 114 that passes through the bore 105. In some embodiments, the gas tube 114 is cylindrical in shape (i.e., a cross section of the gas tube 114 perpendicular to the axis of the gas tube 114 has a circular shape). In other embodiment, a cross section of the gas tube 114 perpendicular to the axis of the gas tube 114 has a non-circular shape, such as a square, a rectangle, a triangle, and the like. The gas tube 1114 provides a conduit for the gas and in many applications, for example low-pressure applications, the cross sectional shape may be any convenient shape. In other embodiments, the gas tube 114 has one or more branches with a similar filter attachment connected to the gas tube 114. In other embodiments, the gas tube has branches attached that connect with other components inside the container 117 (e.g., temperature probe 102 or thermal fluid loop 116) for structural stability. In some embodiments, non-circular cross-sectional shapes are used when pressure in the container 117 is relatively low. The gas tube 114 permits natural gas to be introduced into or removed from the container 117. The gas tube 114 includes an end located in the container 117 and an outlet end 108 located outside of the container 117. In some instances, the outlet end 108 is selectively coupled to a source of natural gas to introduce natural gas into the container 117 and to a device that uses natural gas (e.g., an engine of a vehicle) to remove natural gas from the container 117. In some embodiments, the gas tube 114 is made from a material that includes stainless steel, other metals, plastics, elastomers, or any combination thereof. In some embodiments, the gas tube 114 is made from one or more materials that do not degrade due to pressure, heat, or chemical reaction with a gas in the container 117.

Figure 2A:
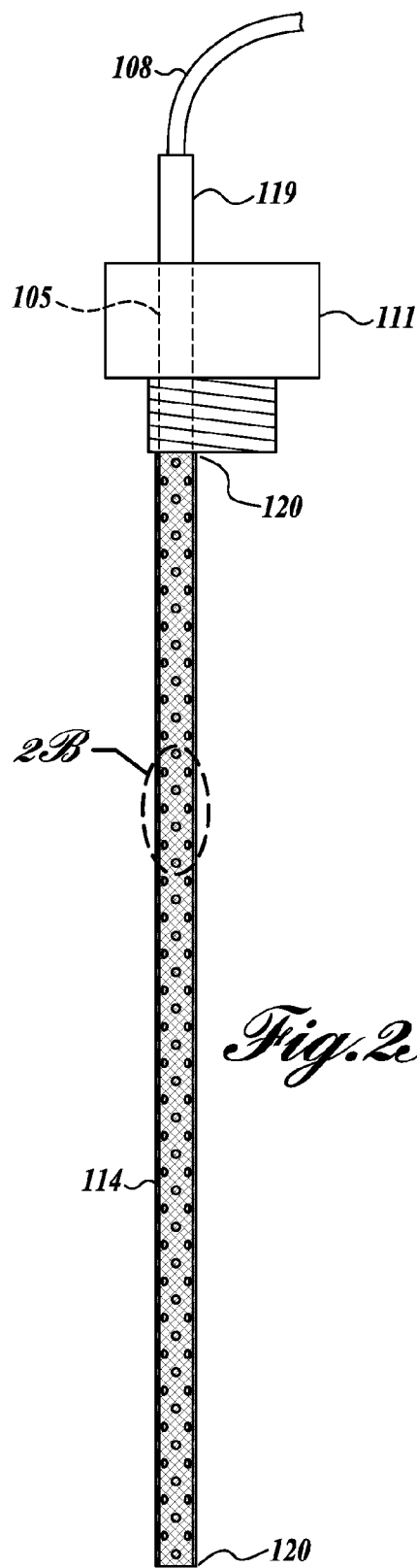
FIGS. 2A and 2B depict a side view and a fragmentary sectional view, respectively, of an embodiment of a filter secured on a gas tube, in accordance with the present invention.
Figure 2B:
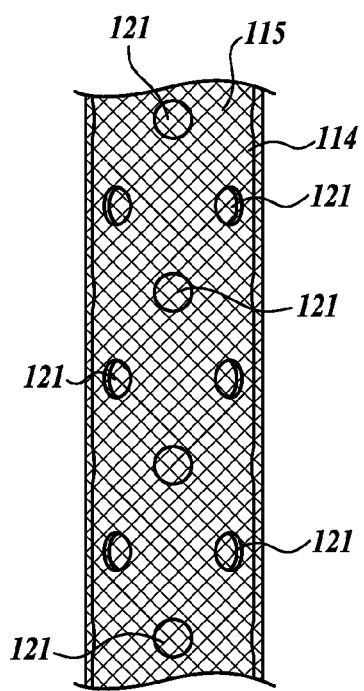

As depicted in the embodiment shown in FIGS. 2A and 2B, the gas tube 114 includes holes 121 configured to permit passage of gas from the gas tube 114 into the container 117 and vice versa. In some embodiments, the holes 121 of the gas tube 114 have the same size (e.g., ⅙-inch diameter holes). In some embodiments, the holes 121 of the gas tube 114 have different sizes (e.g., at least one of the holes has a diameter of each of about 0.2 mm, about 0.4 mm, about 0.6 mm, and about 0.8 mm). The spacing between the holes 121 can be any distance, such as about 0.2 mm, about 0.4 mm, about 0.6 mm, or about 0.8 mm.

In some embodiments, the distribution of locations of holes 121 are determined based on where the gas enters the interior of the container 117 (as opposed to the space within the gas tube 114) such that the cooling due to the Joule-Thomson effect is over a greater area, thereby cooling the container 117 more evenly. Under certain conditions, this cooling effect accelerates the rate that gas molecules attach to the adsorbent 113 when gas is added to the container 117. Once the pressure in the container reaches a particular pressure (e.g., 2,000 psi under certain conditions), the gas (and consequently the container 117) increases in temperature, which slows down the adsorption rate of the gas into the adsorbent 113.

One difficulty with the use of the adsorbent 113 in the container 117 is the potential for loss of the adsorbent 113, particularly during the release of gas from the container 117 through the gas tube 114. Not only does this loss deplete the amount of adsorbent 113 in the container 117, but adsorbent 113 lost through the gas tube 114 is capable of passing to the device or system that consumes the gas (e.g., an engine of a vehicle). The adsorbent 113 is potentially detrimental to the operation of such devices and systems. In some examples, the adsorbent 113 is capable of clogging valves, fittings, pressure regulators, fuel rails, fuel nozzles, and the like if it is allowed to escape from the container 117.

As shown in the embodiment depicted in FIGS. 2A and 2B, the gas tube 114 includes a filter 115 configured to prevent adsorbent 113 from leaving the container 117. In some embodiments, the filter is a mesh filter configured to screen particles (e.g., particles of the adsorbent 113) down to about 5 microns in size. In some examples, the mesh filter is a stainless steel mesh that withstands temperatures in a range from about −60° F. to about 200° F. or greater. In some embodiments, the filter 115 allows gases and/or liquid (e.g., water moisture accompanying the gas) to pass from the container 117 into the gas tube 114. As a valve is opened to allow gas to exit the gas container 117 (e.g., a valve coupled to the outlet 108), the gas passes through the filter 115 into the gas tube 114 via one of the holes 121 and then through the portion of the gas tube 114 in the fitting 111 to exit the container 117. In this way, the filter 115 permits the gas to exit the container 117 while holding the adsorbent 113 inside the container 117.

Figure 4A:
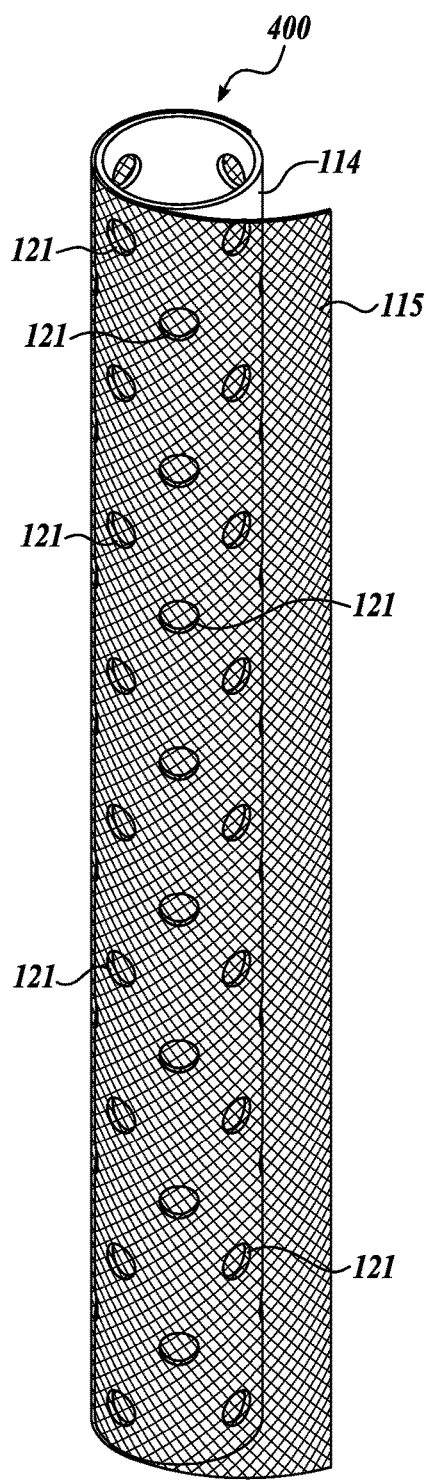
FIGS. 4A and 4B depict various embodiments of filters secured on gas tubes, in accordance with the present invention.

In some embodiments, such as in the embodiment of the tube assembly 400 shown in FIG. 4A, the filter 115 is a single mesh placed around the gas tube 114 so as to cover all of the holes 121. In one example, the filter 115 is a single mesh made from stainless steel configured to filter out adsorbent particles and granules. In some embodiments, individual particles of the adsorbent 113 have a size (e.g., 6 microns or more) that is larger than a size of pores (e.g., 5 microns or less) in the stainless steel mesh filter. In some embodiments, a stainless steel mesh filter 115 with small pores is welded in a shape (e.g., cylindrical, cone or other shape) to fit at close tolerances around the outside of the gas tube 114. In some embodiments, the filter 115 is secured on the gas tube 114 by clamps 120 (e.g., an OETIKER® ear clamp), as depicted in FIG. 2A. In other embodiments, the filter 115 is secured on the gas tube 114 by using a cylindrical clamp or a bonding agent that does not degrade from exposure to the temperatures, pressures, gas or adsorbent 113, by one or more welds to the gas tube 114 in such a way as to prevent adsorbent 113 from escaping the container 117 through the gas tube 114, or in any other way. In some embodiments, the filter 115 is metallic (e.g., stainless steel). In other embodiments, the filter 115 is made from another material configured to filter out particles of the adsorbent 113 and does not degrade due to pressure, temperature or chemical reaction with the gas in the container 117.

Figure 4B:
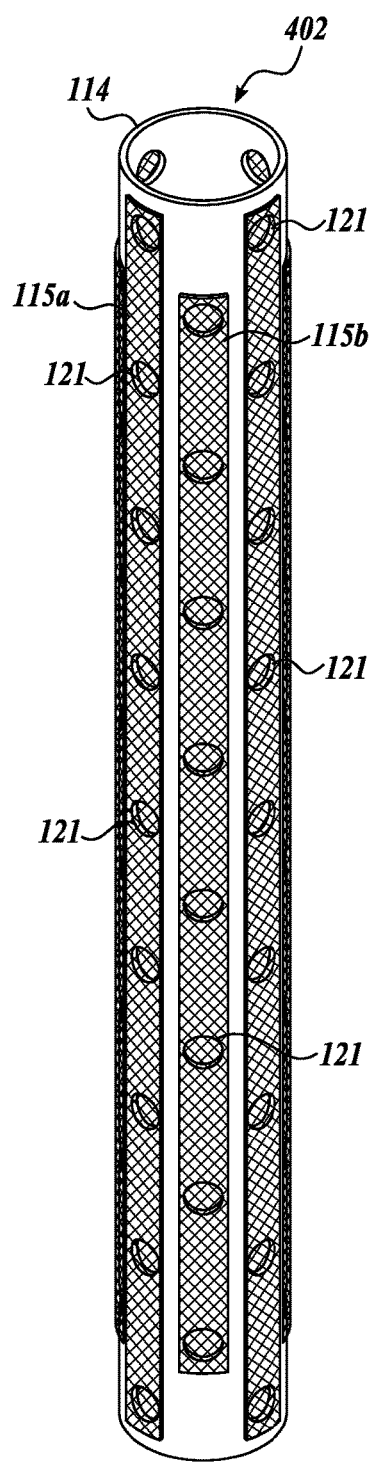

In some embodiments, such as in the embodiment of the tube assembly 402 shown in FIG. 4B, the filter 115 includes multiple filter pieces 115a and 115b, each of which covers some but not all of the holes 121. In one example, where the gas tube 114 includes at least 15 inches of length inside of the container 117, has a ⅝-inch diameter, and ⅛-inch diameter holes 121, the filter 115 includes filter pieces in the form of strips that are 12 inches long and ⅜-inch wide. In the depicted example in FIG. 4B, where some of the holes 121 are arranged axially along the tube, each of the filter pieces 115a and 115b covers the holes 121 in one row. In other examples, the filter 115 includes filter pieces can cover any number of the holes 121, from covering a single hole 121 to covering all of the holes 121.

As shown in FIGS. 1 and 2A, the gas tube 114 in the depicted embodiment is configured to extend through at least one half of the length of the container 117. In some embodiments, the gas tube 114 is configured to extend through about 75% of the length of the container 117, through about 90% of the length of the container 117, through a length of the container 117 in a range from at least one half of the length of the container 117 to about 90% or more of the length of the container 117.

One benefit to this arrangement of the gas tube 114 is increased efficiency in the absorbance in and release of gas from the adsorbent 113 throughout the container 117. In the example where a container has a single inlet/outlet (e.g., at the fitting 111 shown on container 117), any gas introduced into the container has a long path of travel from the single inlet/outlet to the adsorbent at the far end of the container. To utilize the adsorbent at the far end of the container, the gas must be adsorbed by and released from all of the adsorbent between the inlet/outlet and the far end of the container. Such a process is slow and inefficient. In contrast, the ANG system 100 includes the gas tube 114 extending through at least a majority of the length of the container 117. The gas tube 114 itself does not include adsorbent such that gas freely flows from the fitting 111 via the tube 114 to all of the holes 121. This reduces the distance from free-flowing gas to any portion of the adsorbent 113 to the distance from any portion of the adsorbent to the nearest one of the holes 121. In this way, the rate at which gas is adsorbed into the adsorbent 113 from the gas tube 114 (while filling the container 117 with gas) and the rate at which gas is released from the adsorbent 113 into the gas tube 114 (during release of gas from the container 117) are increased due to the shorter distance from the holes 121 in the gas tube 114 to the adsorbent.

In the embodiment depicted in FIG. 1, the ANG system 100 includes a temperature measurement device 101 and a temperature probe 102. In some embodiments, the temperature probe 102 is a thermocouple and the temperature measurement device 101 is a thermocouple measurement device configured to generate a signal indicative of a temperature within the container 117. As shown in FIG. 1, the temperature probe 102 passes through the bore 104 in the fitting 111 to gain access to the interior of the container 117. In some embodiments, the signal generated by the temperature measurement device 101 is used by a device (e.g., a controller) to control one or more of gas flow into the container 117 via the gas tube 114 (e.g., by opening a valve coupled between a pressurized gas source and the gas tube 114), gas flow out of the container 117 via the gas tube 114 (e.g., by opening a valve coupled between the gas tube 114 and a device or system that consumes the gas), heating of the container 117 (e.g., by circulating a heated fluid in the container 117, as discussed in greater detail below), and cooling of the container 117.

In some embodiments, the temperature measuring device 101 or the temperature probe 102 is inserted at a specific depth to measure the temperature of different regions inside the container 117 (e.g., while the container 117 is under pressure). Alternatively, multiple temperature measuring devices 101 and/or temperature probes may be inserted to measure the temperature in different regions inside the container 117. In some embodiments, the shape, length and angle of the temperature probe 102 is varied based on the application. In some embodiments, the temperature probe 102 is made of metal, a metal alloy, or any other material that permits the temperature measurement device 101 to measure the temperature of the adsorbent 113 and gas. In one embodiment, the temperature probe 102 is a straight tube, ⅛ inch in diameter, that is 24 inches in length and is inserted into the container 117 that is one meter in length with the temperature measurement device 101 or temperature probe 102 inserted into the tube through the bore 104. In another embodiment, the tube is similar to the previous example but has a 20 degree angle at its midpoint (e.g., at about 12 inches into the container 117). Under certain circumstances, placement of the temperature probe 102 is most efficient when it measures the adsorbent 113 that is not placed adjacent to the wall of the container 117, the gas tube 104, or the thermal fluid loop 116 (discussed below).

In the embodiment depicted in FIG. 1, the ANG system 100 includes a thermal fluid loop 116. The thermal fluid loop 116 has a first end 109 and a second end 110. The thermal fluid loop 116 passes from the first end 109 via the bore 103a into the interior of the container 117 and exits the interior of the container 117 from the second end 110 via the bore 103b. The thermal fluid loop 116 permits passage of a fluid to either heat or cool the adsorbent 113 in the container 117, and any gas in the container 117. In some embodiments, the portion of the thermal fluid loop 116 inside of the container 117 is made of a metallic material (e.g., copper) configured to withstand the conditions inside the container 117 and the portion of the thermal fluid loop 116 outside of the container 117 is made of a flexible material (e.g., rubber tubing). In one example, the portion of the thermal fluid loop 116 inside of the container 117 is ¼-inch diameter metal tubing that is made from copper or a copper alloy (e.g., a high-pressure copper alloy). In another example, portion of the thermal fluid loop 116 outside of the container 117 has a ½-inch diameter or another size based on fill or release needs for the container 117. In the particular embodiment shown in FIGS. 1 and 2A, a portion of the thermal fluid loop 116 inside of the container 117 is in a corkscrew arrangement around the gas tube 114. In another embodiment not shown in the figures, the thermal fluid loop 116 proceeds from the fitting 111 substantially parallel to an axis of the container 117 with a "U-turn" portion near the far end of the container 117. Other embodiments of the arrangement of the thermal fluid loop 116 inside the container 117 are possible.

In some embodiments, the first end 109 and the second end 110 of the thermal fluid loop 116 are in fluid communication with a heat source. In one example, the first end 109 of the thermal fluid loop 116 receives a fluid from the heat source that is above the temperature of the container 117 (e.g., in a range from about 145° F. to about 165° F.), the fluid passes through the portion of the thermal fluid loop in the container 117 such that heat from the fluid is transferred to the adsorbent and/or the gas in the container 117, and the fluid is returned to the heat source from the second end 110 of the thermal fluid loop 116. In one example, the container 117 is installed on a vehicle (e.g., a car) and the heat source is a coolant system for the engine.

In some embodiments, the first end 109 and the second end 110 of the thermal fluid loop 116 are in fluid communication with a coolant source. In one example, the first end 109 of the thermal fluid loop 116 receives a fluid from the coolant source that is below the temperature of the container 117, the fluid passes through the portion of the thermal fluid loop in the container 117 such that heat from the adsorbent and/or the gas in the container 117 is transferred to the fluid, and the fluid is returned to the coolant source from the second end 110 of the thermal fluid loop 116.

In the embodiment depicted in FIG. 1, the ANG system 100 includes adsorbent dams 106 and 107. The adsorbent dams 106 and 107 are configured to permit access to the container (e.g., to components passing through the fitting 111, to the PRD 118, etc.). The adsorbent dams 106 and 107 prevent loss of the adsorbent 113 from the container 117 and prevent the adsorbent 113 from touching orifices of the container 117 to which a valve or other component is to be attached (e.g., threads to which the fitting 111 is threaded, the PRD 118, etc.). In some embodiments, one or both of the adsorbent dams 106 and 107 is made of pliable material (e.g. plastic, rubber). In some embodiments, one or both of the adsorbent dams 106 and 107 is configured to fit around tubes entering the container 117 and/or cover an opening of the container 117 when the container 117 is being filled with adsorbent 113. In certain circumstances, the adsorbent 113 holds the adsorbent dams 106 and 107 after the container 117 has been filled with the adsorbent 113.

The adsorbent dams 106 and 107 are configured to protect orifices of the container 117 by, among other things, preventing abrasion or contamination of the threads. The adsorbent dams 106 and 107 are also configured to prevent adsorbent 113 from escaping when the container 117 is filled with adsorbent 113 or if it becomes necessary to remove a component (e.g., fitting 111, PRD 118, etc.). In some embodiments, one or both of the adsorbent dams 106 and 107 have a diameter in a range from about 6 inches to about 10 inches and a thickness in a range from about $\frac{1}{32}$ inch to about $\frac{1}{16}$ inch. In some embodiments, one or both of the adsorbent dams 106 and 107 have a particular shape (e.g., circular) to properly fit in container 117 to protect one or more orifices in the container 117. In some embodiments, the adsorbent dam 107 is punctured so that it stretches around an adsorbent delivery tube and covers a separate opening than the one in which the fitting 111 is secured. In other embodiments, such as when the container 117 has one or more openings, the adsorbent dam 107 is punctured to accommodate other components (e.g., thermal probe 102, gas tube 114, thermal fluid loop 116), or combinations thereof, depending on the particular configuration.

Figure 3:
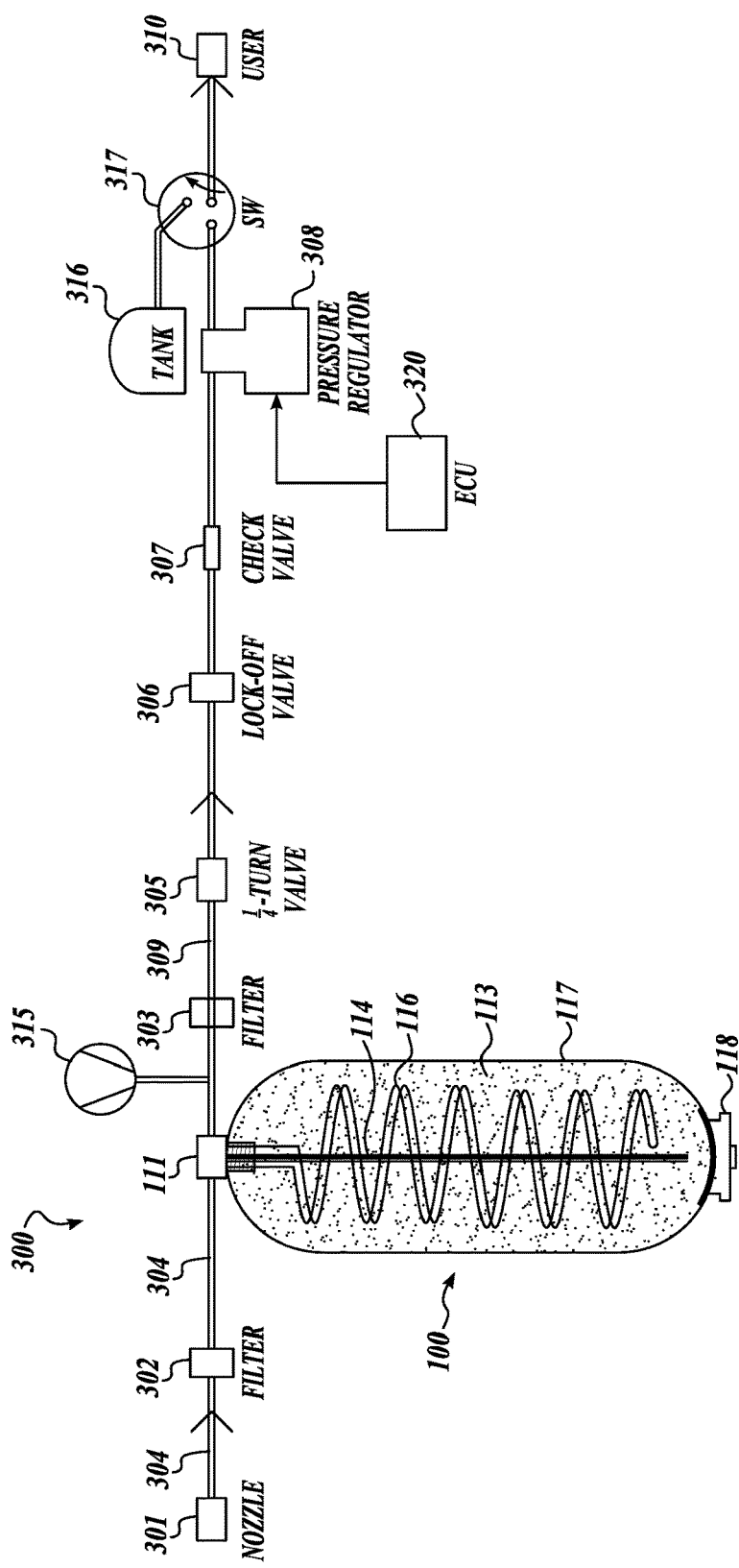
FIG. 3 depicts an embodiment of a system where the ANG system depicted in FIG. 1 supplying gas to a consumption device, in accordance with the present invention.

The ANG system 100 is capable of supplying gas to a consumption device within a system, such as the consumption device 310 within the system 300 depicted in FIG. 3. The system 300 includes a fuel selector switch or fill nozzle 301 coupled to a fill gas line 304. The fill nozzle 301 is configured to be coupled to a source of gas (e.g., natural gas), such as a compressed natural gas cylinder, a natural gas line (e.g., at a residence or business), or any other gas source. The fill gas line 304 carries gas from the fill nozzle 301 via a high pressure filter 302 to the ANG system 100. In some embodiments, the high pressure filter 302 is configured to filter out liquid, such as oil or water, from gas passing through the fill gas line 304. The fitting 111 is configured to direct gas received via the fill gas line 304 into the gas tube 114 in the container 117.

In the system 300, the fitting 111 is coupled to a supply gas line 309 that carries gas from the ANG system 100 to the consumption device 310. In one embodiment, the supply gas line 309 is stainless steel seamless tubing. The gas exiting the container 117 through the gas tube 114 passes into the supply gas line 309 and through a high pressure filter 303. The high pressure filter 303 is configured to filter out any adsorbent 113 in the gas that escaped the container 117 (e.g., through the filter 115).

The gas then passes via the supply gas line 309 through a quarter-turn valve 305, a lock-off valve 306, and a check valve 307. The quarter-turn valve 305 is configured to allow for manual opening and closing of the supply gas line 309. The lock-off valve 306 is a safety valve configured to shut off any unintended flow through the supply gas line 309. The check valve 307 is configured to ensure that gas travels only in one direction (i.e., in the direction toward the consumption device 310).

The gas flowing out of the check valve 307 via the supply gas line 309 passes through a pressure regulator 308 to the consumption device 310. If the pressure of the gas passing through the supply gas line 309 before the pressure regulator 308 is higher than a threshold pressure (e.g., 100 psi), the pressure regulator 308 is configured to reduce the pressure of the gas exiting the pressure regulator 308 to a pressure at or below the threshold pressure. In some embodiments, the pressure regulator 308 includes a pressure transducer and/or a temperature sensor.

In some embodiments, the system 300 also includes a fuel selector switch 317 configured to permit a user to select between supplying the consumption device 310 with gas from the supply gas line 309, with a liquid fuel (e.g., gasoline or diesel) source 316, or with some combination of gas from the supply gas line 309 and a liquid fuel. In some embodiments, the fuel selector switch 317 is configured to provide information regarding the pressure in the container 117 to the user. In some embodiments, the system 300 includes a vacuum pump 315 that is configured to reduce the pressure in the supply gas line 309 to increase the release rate of gas from the adsorbent 113.

The above-described embodiments of the ANG system 100 and the system 300 are capable of being used to perform certain functions. Under some circumstances, the ANG system 100 is configured to filter gas from the adsorbent 113 within the container 117 while the container 117 is pressurized. Under some circumstances, the ANG system 100 is configured to increase the efficiency of (a) gas being adsorbed during filling by cooling, (b) gas being released from the adsorbent 113 by heating, and (c) monitoring temperature within the container 117 using a temperature measurement device 101 and the temperature probe 102 (e.g. a thermocouple probe). In one embodiment, a system includes a fitting configured to be secured to an orifice of a container with one or more bores for components, such as a gas tube, a temperature probe, or a thermal fluid loop.

In some embodiments, the gas tube 114 functions as a cooling component. As noted above, under certain circumstances, the gas entering the interior of the container 117 via the holes 121 in the gas tube 114 causes a cooling effect due to the Joule-Thomson effect, thereby cooling the container 117. Under certain conditions, this cooling effect accelerates the rate that gas molecules attach to the adsorbent 113 when gas is added to the container 117. Once the pressure in the container reaches a particular pressure (e.g., 2,000 psi under certain conditions), the gas (and consequently the container 117) increases in temperature, which slows down the adsorption rate of the gas onto the adsorbent 113.

Figure 5:
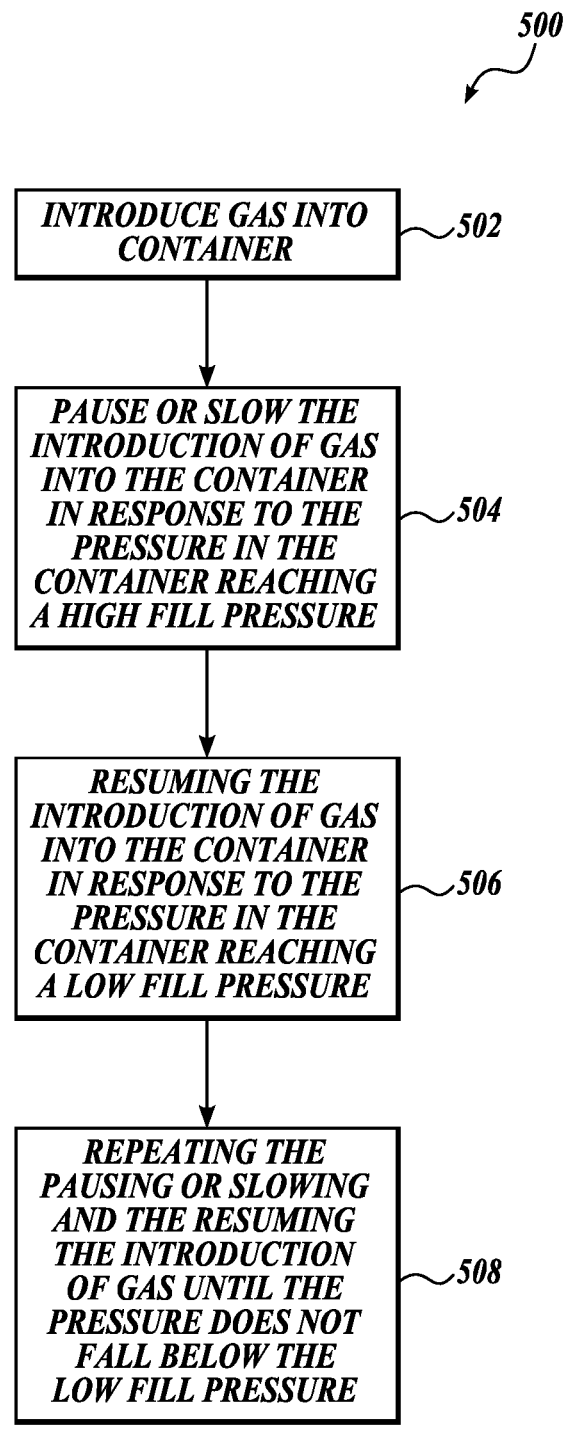
FIG. 5 depicts a method of filling a container while the pressure in the container is monitored, in accordance with the present invention.

In some embodiments, filling the container 117 with gas includes introducing gas into the container 117 while monitoring the gas pressure in the container 117. In some examples, the temperature in the container 117 is also monitored. An embodiment of a method 500 of filling the container 117 while the pressure in the container 117 is monitored is depicted in FIG. 5. At box 502, gas is introduced into the container 117. At box 504, in response to the pressure in the container 117 reaches a high fill pressure (e.g., 3,600 psi), the introducing of the gas into the container 117 is paused or slowed to allow the gas to be adsorbed by the adsorbent 113. The adsorption of the gas by the adsorbent causes the pressure in the container 117 to decrease. At box 506, in response to the pressure in the container 117 reaching a low fill pressure (e.g., 3,500 psi), the introducing of gas into the container 117 is resumed. In some embodiments, as shown in box 508, this process of pausing or slowing the introduction of gas to allow the gas to be adsorbed in response to the pressure reaching the high fill pressure and resuming the introduction of gas into the container 117 is repeated until the pressure in the container does not fall below the low fill pressure. In some embodiments, the process described in this paragraph is performed automatically (e.g., without user input) by a controller 320 (e.g., an electronic controller, a computing device).

In one particular example, a gas compressor is coupled to the container 117. The gas compressor is configured to introduce gas into the container 117 until the pressure within the container 117 reaches a high fill pressure (e.g., 30 psi, 300 psi, 3,000 psi, 3,600 psi). The gas compressor is configured to stop introducing gas into the container 117. While gas is not introduced into the container 117, the gas is adsorbed onto the adsorbent 113 and the pressure decreases. When the pressure within the container 117 falls to a low fill pressure (e.g. 25 psi, 250 psi, 2,500 psi, 3,250 psi), the gas compressor is configured to again introduce gas into the container 117 until the pressure within the container 117 reaches the high fill pressure. This process continues until the pressure within the container 117 reaches a steady pressure between the low fill pressure and the high fill pressure.

As described above, embodiments of the ANG system 100 include a temperature probe 102 coupled to a temperature measurement device 101. In some embodiments, the temperature measurement device 101 is configured to monitor temperature on the inside of a container 117 and send a signal indicative of the temperature to a controller (e.g., valve assembly or pressure switch on a compressor) that regulates the flow of gas into the container 117. In some embodiments, the controller is configured to permit the introduction of gas so that the gas is adsorbed at particular temperatures.

In some embodiments, the temperature measurement device 101 is configured to send the signal indicative of the temperature to a controller configured to adjust temperature within the container 117, such as by regulating the flow of fluid circulating through the thermal fluid loop 116 within the container 117. In some examples, the controller is configured to adjust the temperature in the container 117 to a lower temperature when gas is introduced into the container 117 to increase the effectiveness of the adsorption of the gas onto the adsorbent 113. In other examples, the controller is configured to adjust the temperature in the container 117 to a higher temperature when gas is being released out of the container 117 to increase the effectiveness of the release of the gas from the adsorbent 113. Embodiments of the adsorbent 113 include particulate carbon or other forms of carbon. The heating and cooling of the container 117 is capable of improving the effectiveness of adsorption and/or release of gas regardless of the form of the adsorbent 113.

Variations of the embodiment of the ANG system 100 are used in a wide variety of situations, such as ANG storage containers on natural gas vehicles. The embodiments described herein are capable of being used in low pressure systems (e.g., down to 7 psi) and high pressure systems (e.g., up to 4,000 psi). In some embodiments, the optimal pressure for a system is in a range from about 300 psi to about 1,000 psi. For example, the ANG system 100 is capable of being used with an internal combustion engine, such as motor vehicle engine. In one particular example, a test vehicle was operated for over eight months utilizing natural gas released from adsorbents from an ANG system with a rated operating pressure of 3,600 psi. That test vehicle had a range of approximately 350 miles when starting with the ANG system full of natural gas. The test vehicle's engine was also capable of operating for approximately 30 minutes after the pressure of the gas in the container of the ANG system was below 100 psi. One reason that the vehicle was able to continue operating at such a low pressure level, was the heating of the interior of the container using a thermal fluid loop, which increased the rate of release of gas from the adsorbent sufficient to continue operation of the vehicle. Some other applications for the adsorbent systems can be well head storage at oil/gas wells, transportation of natural gas, fueling station storage, and replacing LPG tanks with ANG tanks (e.g., from small barbeque tank size up to the large commercial LPG storage tanks).

Other attempts of using particulate adsorbents have used a bonding agent to hold the particulate together in an attempt to avoid losing the particulate. However, the use of a bonding agent reduces the surface area of the adsorbent available to adsorb gas, thereby reducing the effectiveness of the adsorbent to adsorb gas. In addition, the bonding agent reduces the rate at which the adsorbent can be heated and cooled. In contrast, in some embodiments of the ANG system 100 described herein, the combination of the adsorbent 113 in particulate form, the gas tube 114 with holes 121 running through a majority of a length of the container 117, the filter 115 preventing the adsorbent 113 particulates from entering the gas tube 114, and the thermal fluid loop 116 do not use any bonding agent with the adsorbent 113. The absence of bonding agent in the adsorbent 113 significantly increases the effectiveness of the ANG system over these other attempts at using adsorbents to store gas. The ability to heat the particulate adsorbent 113 also extends the range that vehicles are capable of being operated, even over compressed natural gas storage, thereby reducing storage costs and the number of times that gas storage is refilled.

Additionally, as it has been described, the embodiments of ANG systems 100 describe herein are capable of having the same or greater capacity as comparable compressed natural gas systems and the embodiments of the ANG systems 100 described herein are capable of operating vehicles at lower pressures than comparable compressed natural gas systems. Because of these advantages, the container 117 of the ANG system 100 and other components of systems (e.g., the system 300) can have thinner walls and other components that withstand the lower pressures. A container 117 with thinner walls is less expensive to manufacture, is capable of being made in more varieties of shapes, and is capable of being lighter, thus incrementally increasing the range of motor vehicles and decreasing the cost of the system.

Being able to fill a container 117 to a lower pressure also results in less energy, less equipment, and lower cost to compress the gas. Being able to fill the container 117 to a lower pressure also makes filling more accessible. For example, natural gas is currently available at many residences and businesses. However, the equipment and energy required to compress natural gas to the industry standard 3,600 psi for compressed natural gas systems is very costly and inefficient. In addition, such equipment is mostly unavailable to the public because of its high cost and lack of durability. If natural gas were more usable at lower pressures (e.g., using the embodiments of the ANG system 100 described herein), natural gas containers could be filled at homes and business through the existing equipment already in place. The cost of natural gas distributed to homes and businesses through pipelines range in rates that are generally much lower than gasoline (e.g., $0.70 to $0.80 per gasoline gallon equivalent (gge)). This makes the use of the embodiments of systems and methods described herein very desirable to help fuel gasoline and diesel engines at a lower cost compared to gasoline or diesel purchased at typical fuel filling stations.

Systems and methods disclosed herein are capable of providing equivalent storage capacity at low pressures thereby allowing operators to fill from existing natural gas meters (i.e., at the site of businesses and residences) at reduced costs. The containers 117 can also be filled at high pressure filling stations (e.g., compressed natural gas filling stations). However, the time to fill a container with adsorbent may take longer, depending on the type of adsorbent being used, than the time to fill a traditional compressed natural gas container because of the time it takes the gas to adsorb onto the adsorbent (e.g., adsorbent 113). Once an initial quantity of the natural gas has enough time to be adsorbed, more natural gas can be introduced into the container. This process can take several hours. However, the time for a total fill can be reduced with the cooling effect described above with respect to the gas tube 114 and/or with the circulation of a cooling fluid in the thermal fluid loop 116 described above.

Prior adsorbed natural gas solutions have not been considered or utilized for storing CNG at low to medium pressures (e.g., in a range from about 20 psi to about 2,050 psi) in the past because the vast majority of CNG consumption devices (e.g., vehicles, motors, other equipment) operate with the pressure entering the CNG consumption device (e.g., after a pressure regulator) at a pressure in a range from about 100 psi to about 150 psi. In addition, where the CNG consumption devices are engines of motor vehicles, the engines require a large amount of natural gas stored at high pressure to have an acceptable range of driving. In order to store the large volumes needed to meet the market demand for an acceptable range (e.g., 350 miles), it was necessary to store the CNG at pressures ranging from 3,000 psi to 3,600 psi. The embodiments of systems described herein have been developed for ANG applications and can utilize natural gas from a container when it has as very low pressure, in some cases as low as 16 psi. The systems disclosed herein make it possible for such vehicles to be operated even at this very low pressure of natural gas. And, with the ability to store natural gas at lower pressures in the ANG systems described herein, appropriate ranges of vehicle driving are achieve to meet market demand. The ANG systems also use simple, existing compressor technology that is inexpensive compared to high pressure compressors (e.g., three- to four-stage compressors). Low- to medium-pressure compressors, which may be used to increase the rate at which the ANG systems are filled, also have a much better durability record, resulting in cost savings over time.

In some embodiments, the container 117 (e.g., gas cylinders) is filled with adsorbent 113 by insert an predetermined amount of adsorbent 113 into the container 117 via the adsorbent dam 106 and outside of the gas tube 114. The adsorbent dam 106 and the filter 115 prevent the adsorbent 113 from escaping the container 117. Once the container 117 is filled with the adsorbent 113, depending on the type and content profile of the gas, the container 117 is capable of holding more gas at lower pressures than without the adsorbent 113. In some embodiments, this is accomplished by manipulating the temperature of the adsorbent 113 to hasten adsorption and/or release of the gas from the adsorbent 113. In some embodiments, two methods of heating may be used: (1) heating the container 117 from the outside of the container 117, and (2) passing heating fluid through the thermal fluid loop 116 while under pressure.

The systems and methods described herein also more efficiently store and release gas from adsorbent 113, regardless of the form of the adsorbent 113. One of the challenges with adsorbent 113 in the form of small particulate material is that it is difficult to fill the container 117, as well as difficult to fill them to a particular density. In some embodiments, filling the container 117 with particulate adsorbent 113 includes compacting the adsorbent 113 to a particular density. The increased density of the adsorbent 113 is capable of being done safely and economically to better utilize beneficial properties of the adsorbent 113.

Many CNG conversion systems on vehicles operate with pressures entering the engine between 100 psi and 150 psi (e.g., after the CNG passes through the pressure regulator). These systems use an injection system that needs this range of pressures to operate. Since systems operating at lower pressures (e.g., under 100 psi) have not been used in the past, other implementations of natural gas for vehicles have not focused on these types of low pressure systems. The ANG systems disclosed herein can utilize methane gas at low pressures to operate even large engines (e.g., 8.1 liter displacement engines). The ANG systems disclosed herein allow for vehicles to operate on natural gas when the pressure is very low (e.g., down to 16 psi). The ability to heat the ANG systems described herein provide improvements in operating at low pressures to get the needed range to optimally operate the engine, thus increasing the utility of ANG vehicle systems. Because a large amount natural gas is released from the adsorbent 113 even when the pressure in the container 117 is low (e.g., under 100 psi), the ANG systems described herein are configured to deliver the natural gas flow needed for a very large range of sizes of motors and engines (e.g., from small engines with two cylinders, up to large engines with ten cylinders) to operate. Under certain scenarios, the ANG systems described herein are capable of supplying the amount of natural gas required to operate engines under load (e.g., when a vehicle is going up a hill or is towing a heavy trailer).

Embodiments of systems described herein (e.g., the system 300) are capable of being constructed using a number of different components. Examples of such components include tubing (e.g., ⅜ inch tubing as the supply gas line 309), pressure regulators, injectors and/or fuel rails, electronic control units 320 (e.g., secondary fuel controllers or internal fuel controllers), fuel selector switches (e.g., switches that allow a user to select between fuel and/or natural gas), and vacuum pumps. In some embodiments, pressure regulators are configured to continue delivering sufficient flow of natural gas for vehicles to operate with a lower pressure (e.g., between about 10 psi and about 99 psi) and to reduce the pressure of natural gas coming from an ANG container (e.g., container 117) to a lower pressure (e.g. less than 100 psi). Additional components that can be used in such systems include any or all of fill nozzles, fittings, clamps, filters (e.g., vapor filter, moisture, oil, water), valves (e.g., quarter-turn, lock-off, check), hoses, tubing, pressure release devices, tanks, brackets, nuts, bolts, or screws.

In some embodiments, natural gas flows out of a pressure regulator (e.g., pressure regulator 308) from outlets through tubing (e.g., metal tubing, rubber tubing) into each side of one or more fuel rails to get a balanced and substantially equal pressure to each cylinder of an engine. In some examples, fuel rails are made up of a specified number of injectors (e.g., three, four, five, six, eight, ten) that are timed by the electronic control unit 320 to open and shut as needed for the engine cylinder to receive the a particular amount of natural gas to operate efficiently. The configuration of the pressure regulator, tubing, and the one or more fuel rails is dependent upon the particular application. For example, in one configuration, the pressure regulator includes one outlet for the end of each of the one or more fuel rails (e.g., four outlets for the four cylinders of a 2.0 liter engine). In yet another configuration, the pressure regulator includes a plurality of outlets and tubing for to both ends of two fuel rails.

In some embodiments, the systems disclosed herein have a customized calibration to not only keep an engine operating in a large range of circumstances (e.g., when the vehicle is under load or when natural gas is being delivered from a container at low pressures, such as 20 psi, but to also pass emissions tests in a laboratory. The ability to pass emission tests allows for approved by governmental agencies (e.g., the Environmental Protection Agency).

In some embodiments, the hoses and fittings used in the systems disclosed herein (e.g., between a pressure regulator and a fuel rail) are sized to accommodate a particular amount of gas for the engine. Once the gas passes through the fuel rails it is delivered through a tube (e.g., a rubber hose) to nozzles configured to insert the gas into the intake manifold of the engine. In some embodiments, these nozzles are a larger size than are used in typical CNG system configurations and are configured to optimize flow in the ANG system.

Some embodiments of the ANG systems disclosed herein include a reducer configured to reduce the pressure of natural gas. In some examples, the reducer is configured to reduce pressure of natural gas from pressures as high as 3,600 psi down to pressures as low as 10 psi on a continuous basis to deliver the flow of sufficient volumes of natural gas needed to run large engines. In another example, a pressure regulator is configured to reduce pressure of natural gas from pressures as high as 4,000 psi down to pressures as low as 24 psi.

In some embodiments, the ANG system disclosed herein are capable of operating vehicles at low pressures because they provide a higher flow rate of natural gas at the lower pressures. Thus, in these embodiments, the ANG systems include components (e.g., pressure regulators, tubing, electronic control units, fuel rails, nozzles) configured to accommodate a higher rate of flow of natural gas at lower pressures (e.g., less than 100 psi) than used in conventional CNG systems.

In some embodiments, an automatic fill system is configured to fill ANG systems with containers (e.g., container 117) that contain adsorbent (e.g., adsorbent 113). In some embodiments, the automatic fill system includes a compressor, a natural gas leak sensor (e.g., methane leak sensor), an automatic shut off valve, a pressure switch, and a spark-proof electric system. This combination of components is different than traditional gas compressors because it is configured to optimize natural gas adsorption, including monitoring and adjusting the fill rate and maximizing the amount of gas that can be stored in the container. In some embodiments, the configurations and/or settings of the automatic fill system (e.g., for pressures and rate of gas fill) are adjustable to keep the gas pressure within an approved parameter (e.g., a working pressure) of the container.

Additional time is needed for adsorbents to adsorb gas than when filling containers that do not contain adsorbent. In some embodiments, the automatic fill system accommodates the adsorption process by filling the gas container to a high fill pressure (e.g., 500 psi for natural gas). Once the gas pressure in the gas container reaches high fill pressure, the pressure switch discontinues the compressor function until the pressure decreases (e.g., as the gas is adsorbed into the adsorbent) to a low fill pressure (e.g., 400 psi). At this point, the pressure switch recognizes the drop in pressure and the compressor then starts to fill the container again until it gets back up to the high fill pressure. In some examples, the compressor continues in this cycle until the adsorbent is saturated with the subject gas.

The automatic fill system can be used with gases other than natural gas. In one alternate configuration, the natural gas sensor is not included or is replaced by a sensor that recognizes the presence of the gas or gases being used. In yet another alternate configuration, the automatic fill system does not include a spark-proof electric system when non-flammable gases are used to fill the container.

Various embodiments of automatic fill systems have a large variety of sizes depending on the application. In one embodiment, the compressor includes a two horsepower compressor powered by electricity from a standard (e.g., 110 volt) wall outlet. In yet another embodiment, the compressor is powered by natural gas. In yet other embodiment, the automatic fill system is located entirely onboard a vehicle and has a compressor assembly with a quarter horsepower, battery-powered motor.

As described above, the gas tube 114 is configured to cool the adsorbent 113 in the container 117 based on the Joule-Thomson effect during filling of the container 117 with gas. As a gas container 117 is filled, the container 117 has a pressure lower than the gas being introduced into the container 117 via the holes 121 in the gas tube 114. As the gas passes through a cylinder valve into the gas tube 114, it cools as it is released through the holes 121 (e.g., holes 121 that are spaced at intervals along the length of the gas tube 114), thereby cooling the adsorbent 113 adjacent to the gas tube 114. In current gas containers that have a single inlet, this cooling effect only cools the space immediately surrounding the single inlet and not the rest of the container. When filling a container without the gas tube 104, the end of the container where the valve is located can be much lower (e.g., 100 degrees F. lower) than the opposite side of the container. This lack of temperature consistency throughout the gas container is exaggerated in adsorbent containers because the adsorbent decreases the rate at which the heat or cooling is distributed throughout the container.

In some embodiments, an automatic fill system monitors (e.g., using an electronic gauge) temperature and includes an automated valve that increases and decreases the flow of gas into the container to increase adsorption of the gas based on the temperature inside the container. This function operates in conjunction with other temperature and adsorption control methods disclosed herein to adjust the flow through the fill valve at specified pressure settings (e.g., 2,000 psi with natural gas) by increasing the flow rate of gas through the valve before the adsorbent increases in temperature to a sub-optimal level.

Because, in some embodiments, the gas tube 114 runs in a range from about half of the length of the container 117 to the full length of the container 117, the gas travels a shorter distance through the space containing adsorbent 113 to get to one of the holes 121 in the gas tube 114. Because the gas can travel unobstructed in the gas tube 114, the gas has a shorter distance to travel until it travels unobstructed on the path out of the container 117. The cooling effect that occurs during the fill process has an added benefit in that it distributes the gas more evenly during filling and throughout the container than it would otherwise. When gas is released from the adsorbent 113 (e.g., for natural gas during the operation of a motor vehicle), the gas releases from the adsorbent easier, as it has less distance to travel through adsorbent 113 to a conduit through which it can travel out of the container 117 unobstructed. If the gas has to travel from one end of the container to the other entirely through the adsorbent, it will take longer, thereby lengthening the time for the gas to attach while filling and to get to the escape point on its way out of the container 117 when releasing. In some embodiments, the gas tube 114 is configured to permit gas to enter and exit the container 117 under very low pressures (e.g., as low as about 0.1 psi) and at very high pressures (e.g., up to about 4,500 psi). To accommodate such pressures, in some embodiments, components (e.g., bore 105, connector 119) are configured to safely withstand such pressures. Brazing the tubing with the cylinder fitting at the point it enters or leaves the cylinder is also a way to keep the tank safe when under high pressures.

In some embodiments, the ANG systems disclosed herein include a fitting (e.g., fitting 111) that has an internal gas release system. In some embodiments, the internal gas release system is a device that includes a charge delivery component (e.g., wires made of copper) that are immersed in the adsorbent on the inside of the container and deliver an electric charge to the adsorbent. The electric charge heats the adsorbent and increases the rate of release of gas from the adsorbent.

The charge delivery component can be of many configurations. In some examples, the charge delivery component includes conductive material at each end of the tank or low or high diameter wires, the charge delivery component has various numbers of wires, and/or the charge delivery wires are attached to one or more points to other components of the fitting. In one configuration, ten 20-gauge exposed copper wires of varying length (e.g., 4 inches, 6 inches, 8 inches) are attached at substantially equal intervals along the axis of the container. In yet another configuration, there are only two unattached 14-gauge gold wires of a particular length (e.g., 3 inches in length) that have only a portion (e.g., 1 inch of the wires) exposed at the ends.

In some embodiments, the charge delivered to the adsorbent varies based on the particular application. In one example, the conductivity of the adsorbent is used to create heat from different electric poles that are energized with electricity. In one embodiment, the charge is delivered when the pressure in the container is reduced to a specific pressure (e.g., 120 psi), thereby releasing the natural gas to be used in an application outside the tank.

In different embodiments, components of fittings for ANG systems (e.g., fitting 111) are different in shape and/or structural integrity. In some embodiments, a buffer material is attached to points at which the respective components are capable of moving (e.g., bouncing) and touch the inside of the connate. In some example, contact point buffers include a small length of rubber tubing fitted over one inch of the end of a thermal fluid loop (e.g., the thermal fluid loop 116). In some examples, the material of such buffers depends on the gas or gases used in the container and/or the type of adsorbent used in the container. In some examples, such materials are configured not to react with the gas or adsorbent and further configured not to degrade (or to minimally degrade) over time.

Referring back to the ANG system 100 depicted in FIG. 1, various methods of filling the container 117 with adsorbent 113 are possible. In some embodiments, the adsorbent 113 is difficult to work with because it easily becomes airborne if disturbed or moved, particularly when in a particulate format. Airborne adsorbent 113 is not desirable for a number reasons, such as potential health dangers if breathed. In other embodiments, some finished adsorbent materials include a bonding agent (e.g., sodium silicate) to keep the particulate adsorbent together. The bonding agent prevents the adsorbent from blowing away and compacts the adsorbent to a higher density. One problem with using bonding agents is that the adsorbent loses some of its adsorption capabilities because (a) the bonding agent itself takes up space where gas would occupy in the container and (b) the bonding agent renders much of the adsorbent incapable of adsorbing gas because a bonding agent blocks the point at which a gas particle would attach to the adsorbent. As disclosed herein, embodiments of the adsorbent 113 used in the container 117 do not include bonding material.

The adsorbent dams 106 and 107 allow for filling the container 117 with adsorbent 113 more easily, efficiently, and without losing the adsorbent 113 out of the container 117. Additionally, the filter 115 is configured to prevent the adsorbent 113 from entering the gas tube 114, and therefore from exiting the container 117 via the gas tube 114. In one embodiment, a method of filling the container 117 with adsorbent 113 in a particulate form includes coupling a vacuum (e.g., shop vac) to the gas tube 114 in such a way that any gas already in the empty container 117 (e.g., nitrogen, air) will flow from outside of the gas tube 114 inward and out of the container 117. A second tube passes from a source of adsorbent 113 into the container 117. In one embodiment, the second tube passes through the adsorbent dam 107. In this embodiment, the adsorbent 113 is drawn into the container 117 via a side of the container 117 opposite which the vacuum is coupled. In another embodiment, the second tube passes through one of the bores of the fitting 111 that are used for other purposes once the adsorbent 113 is filled in the container 117 (e.g., via the bore 104 for the temperature probe 102). The suction of the vacuum through the gas tube 114 cause the adsorbent 113 to be drawn through the second tube into the container 117. In one example, the vacuum is configured to be operated when the container is situated such that the fitting 111 is below the opening at the other end of the container 117 and the second tube passes through the opening at the other end of the container 117 such that the adsorbent 113 is drawn to the bottom of the container and against the gas tube 114.

In some embodiments, the rate at which gas (e.g., nitrogen) flows through the vacuum is varied. Under certain conditions, increasing the vacuum flow rate causes the adsorbent 113 to compact around the gas tube 114 and filter 115 to a particular compaction ratio. Based on the volume inside of the container 117, the volume of space taken up by other components inside the container, and the weight of the adsorbent 113 drawn into the container 117, the compaction ratio can be measured and obtained. In one embodiment the compaction ratio of volume of the container 117 filled with adsorbent particles is 75% or more. Once the container 117 is filled with the adsorbent 113 to a particular compaction ratio based on the type of adsorbent being used, the opening through which the adsorbent 113 is inserted into the container 117 is closed. In some embodiments, the opening in the container 117 is closed by another component (e.g., temperature probe 102) being inserted into the opening, attaching a valve to the opening, placing PRD 118 over the opening, or in any other way that would not allow the adsorbent 113 to exit the container 117.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A gas system comprising:
   a container configured to store a combustible gas under pressure, the container having an opening and a length;
   a fitting attached to the container and configured to engage the opening, the fitting defining a flow path into the container;
   a gas tube extending from the fitting flow path and into the container, the gas tube extending along at least one half of the length of the container, wherein the gas tube includes a plurality of holes;
   a quantity of a particulate adsorbent located in the container and outside of the gas tube, wherein the adsorbent comprises particles having a characteristic minimum size, and further wherein the adsorbent is selected to adsorb the combustible gas; and
   a filter coupled to the gas tube and configured to cover the plurality of holes in the gas tube, wherein the filter is configured to permit passage of gas into and out of the gas tube and to prevent the passage of adsorbent particles into the gas tube.

2. The gas system of claim 1, wherein the fitting is threadably attached to the opening of the container to form a seal with the opening of the container.

3. The gas system of claim 1, wherein the characteristic minimum size of the particles is greater than 5 microns and the filter is a mesh filter configured to prevent passage of the particles.

4. The gas system of claim 3, wherein the mesh filter is secured to the gas tube with at least two clamps.

5. The gas system of claim 1, wherein the filter is welded or bonded to the gas tube.

6. The gas system of claim 5, wherein the filter comprises a plurality of strips that are attached to the gas tube.

7. The gas system of claim 1, further comprising a temperature probe disposed in the container and imbedded in the particulate adsorbent and configured to monitor a temperature of the absorbent, and to provide a signal indicative of the monitored temperature.

8. The gas system of claim 7, wherein the temperature probe is disposed in a tube inserted into the container through a second bore in the fitting.

9. The gas system of claim 1, further comprising a thermal loop having a first end extending into the container, a loop portion disposed in the container and away from the gas tube, and a second end extending out of the container, wherein the thermal loop is configured to: (a) heat the adsorbent to facilitate desorption of gas from the adsorbent, or (b) cool the adsorbent to facilitate adsorption of gas to the adsorbent.

10. The gas system of claim 9, wherein the thermal loop comprises a thermal fluid loop configured to conduct a hot fluid through the container or to conduct a cold fluid through the container.

11. The gas system of claim 9 wherein the first end of the thermal loop extends through an entry bore in the fitting and the second end of the thermal loop extends through an exit bore in the fitting.

12. The gas system of claim 1, further comprising a device configured to deliver an electric charge to the adsorbent to generate heat and increase the release rate of the gas from the adsorbent.

13. The gas system of claim 1, further comprising a gas line configured to direct an outflow of gas from the gas tube to at least one injector configured to inject the directed gas into an engine, and a pressure regulator coupled to the gas line and configured to regulate a pressure of the outflow of gas such that the gas directed to the injector has a pressure in a range from 5 psi to 149 psi.

14. The gas system of claim 13, further comprising an electronic control unit configured to control at least the pressure regulator.

15. The gas system of claim 13, further comprising a fuel selector switch configured to selectively control a fuel source to the engine.

16. The gas system of claim 13, further comprising a vacuum pump configured to reduce pressure in the gas line to increase a release rate of the gas from the adsorbent.

17. The gas system of claim 1, further comprising at least one adsorbent dam configured to prevent the adsorbent inside the container from exiting the container via the opening of the container or another opening of the container.

18. The gas system of claim 1, wherein the adsorbent is configured to be inserted into the container via a tube passing through the opening in the container or another opening in the container by a vacuum coupled to the gas tube, such that the adsorbent is drawn from a source of the adsorbent into the container.

* * * * *

UNITED STATES PATENT AND TRADEMARK OFFICE
CERTIFICATE OF CORRECTION

PATENT NO.         : 10,018,306 B2
APPLICATION NO.    : 15/067072
DATED              : July 10, 2018
INVENTOR(S)        : G. W. Fanger et al.

It is certified that error appears in the above-identified patent and that said Letters Patent is hereby corrected as shown below:

In the Specification

| Column | Line | Error |
| --- | --- | --- |
| 5 | 60 | "gas tube 1114" should read --gas tube 114-- |
| 7 | 42 | "can cover" should read --that can cover-- |
| 8 | 1 | "tube 114" should read --gas tube 114-- |
| 8 | 37 | "probes" should read --probes 102-- |
| 8 | 55 | "gas tube 104" should read --gas tube 114-- |
| 9 | 7 | "portion" should read --the portion-- |
| 11 | 38 | "reaches" should read --reaching-- |
| 13 | 44 | "business" should read --businesses-- |
| 14 | 20 | "as very" should read --a very-- |
| 14 | 34 | "insert" should read --inserting-- |
| 15 | 9 | "natural" should read --of natural-- |
| 15 | 47 | "the a" should read --the-- |
| 15 | 55 | "for to both" should read --for both-- |

Signed and Sealed this
Twentieth Day of November, 2018

Andrei Iancu
*Director of the United States Patent and Trademark Office*

CERTIFICATE OF CORRECTION (continued)
U.S. Pat. No. 10,018,306 B2

| | | |
|---|---|---|
| 15 | 63 | "approved" should read --approval-- |
| 16 | 18 | "system" should read --systems-- |
| 17 | 18 | "gas tube 104" should read --gas tube 114-- |